(12) United States Patent  
Hooker et al.

(10) Patent No.: US 8,909,908 B2  
(45) Date of Patent: Dec. 9, 2014

(54) MICROPROCESSOR THAT REFRAINS FROM EXECUTING A MISPREDICTED BRANCH IN THE PRESENCE OF AN OLDER UNRETIRED CACHE-MISSING LOAD INSTRUCTION

(75) Inventors: Rodney E. Hooker, Austin, TX (US);  
Gerard M. Col, Austin, TX (US);  
Bryan Wayne Pogor, Round Rock, TX (US)

(73) Assignee: VIA Technologies, Inc., New Taipei (TW)

( * ) Notice: Subject to any disclaimer, the term of this patent is extended or adjusted under 35 U.S.C. 154(b) by 1265 days.

(21) Appl. No.: 12/582,975

(22) Filed: Oct. 21, 2009

(65) Prior Publication Data

US 2010/0306506 A1     Dec. 2, 2010

Related U.S. Application Data

(60) Provisional application No. 61/182,297, filed on May 29, 2009.

(51) Int. Cl.
*G06F 9/30* (2006.01)
*G06F 9/38* (2006.01)

(52) U.S. Cl.
CPC ............ *G06F 9/3842* (2013.01); *G06F 9/3806* (2013.01); *G06F 9/3861* (2013.01)
USPC ........................................................ 712/239

(58) Field of Classification Search
None
See application file for complete search history.

(56) References Cited

U.S. PATENT DOCUMENTS

| 5,584,038 | A  | * | 12/1996 | Papworth et al. ............... 712/23 |
| 5,812,839 | A  | * | 9/1998  | Hoyt et al. ..................... 712/239 |
| 2010/0299504 | A1 | * | 11/2010 | Henry et al. ................... 712/214 |
| 2011/0208950 | A1 | * | 8/2011  | Tran et al. ..................... 712/214 |

* cited by examiner

*Primary Examiner* — William B Partridge  
(74) *Attorney, Agent, or Firm* — E. Alan Davis; James W. Huffman

(57) ABSTRACT

A pipelined out-of-order execution in-order retire microprocessor includes a branch predictor that predicts a target address of a branch instruction, a fetch unit that fetches instructions at the predicted target address, and an execution unit that: resolves a target address of the branch instruction and detects that the predicted and resolved target addresses are different; determines whether there is an unretired instruction that must be corrected and that is older in program order than the branch instruction, in response to detecting that the predicted and resolved target addresses are different; execute the branch instruction by flushing instructions fetched at the predicted target address and causing the fetch unit to fetch from the resolved target address, if there is not an unretired instruction that must be corrected and that is older in program order than the branch instruction; and otherwise, refrain from executing the branch instruction.

11 Claims, 2 Drawing Sheets

MICROPROCESSOR THAT REFRAINS FROM EXECUTING A MISPREDICTED BRANCH IN THE PRESENCE OF AN OLDER UNRETIRED CACHE-MISSING LOAD INSTRUCTION

CROSS REFERENCE TO RELATED APPLICATION(S)

This application claims priority based on U.S. Provisional Application, Ser. No. 61/182,297, filed May 29, 2009, entitled MICROPROCESSOR WITH SELECTIVE OUT-OF-ORDER BRANCH EXECUTION, which is hereby incorporated by reference in its entirety.

FIELD OF THE INVENTION

The present invention relates in general to the field of out-of-order execution microprocessors, and particularly to branch instruction execution therein.

BACKGROUND OF THE INVENTION

Superscalar microprocessors have a plurality of execution units that execute the microinstruction set of the microprocessor. Superscalar microprocessors attempt to improve performance by including multiple execution units so they can execute multiple instructions per clock in parallel. A key to realizing the potential performance gain is to keep the execution units supplied with instructions to execute; otherwise, superscalar performance is no better than scalar, yet it incurs a much greater hardware cost. The execution units load and store instruction operands, calculate addresses, perform logical and arithmetic operations, and resolve branch instructions, for example. The larger the number and type of execution units, the farther back into the program instruction stream the processor must be able to look to find an instruction for each execution unit to execute each clock cycle. This is commonly referred to as the lookahead capability of the processor.

One way to improve the lookahead capability is to allow instructions to execute out of their program order, commonly referred to as an out-of-order execution microprocessor. Although instructions can execute out-of-order, the architecture of most microprocessors requires that instructions be retired in program order. That is, the architectural state of the microprocessor affected by an instruction result must only be updated in program order.

Out-of-order execution in-order retire microprocessors typically include a relatively large number of pipeline stages, sometimes referred to as super-pipelining. One reason a microprocessor may have a relatively large number of pipeline stages is if its instruction set architecture allows instructions to be variable length, which typically requires a relatively large number of pipeline stages at the top of the pipeline to parse the stream of undifferentiated instruction bytes into distinct instructions and, commonly, to translate the parsed instructions into microinstructions.

The detrimental impact on performance of taken branch instructions in a super-pipelined microprocessor is well known, as is the performance benefits of branch prediction in the art of microprocessor design. More specifically, the larger the number of pipeline stages between the stage that fetches instructions (in response to a branch predictor providing a predicted branch target address) and the stage that causes the fetcher to begin fetching at a resolved target address different from the predicted target address, the larger the penalty associated with branch misprediction.

Therefore, what is needed is a high performance method of executing branch instructions within an out-of-order execution in-order retire microprocessor.

BRIEF SUMMARY OF INVENTION

According to one aspect, the present invention provides a pipelined out-of-order execution in-order retire microprocessor. The microprocessor includes a cache memory, a branch predictor configured to predict a target address of a branch instruction, a fetch unit, coupled to the branch predictor and configured to fetch instructions at the predicted target address, and an execution unit coupled to the fetch unit. The execution unit is configured to resolve a target address of the branch instruction and detect that the predicted and resolved target addresses are different. The execution unit is also configured to determine whether there is an unretired load instruction that missed in the cache memory and that is older in program order than the branch instruction in response to detecting that the predicted and resolved target addresses are different. The execution unit is also configured to execute the branch instruction by flushing instructions fetched at the predicted target address and causing the fetch unit to fetch from the resolved target address if there is not an unretired load instruction that missed in the cache memory and that is older in program order than the branch instruction. The execution unit is also configured to refrain from executing the branch instruction if there is an unretired load instruction older than the branch instruction in program order and that missed in the cache memory. The microprocessor further comprises a pipeline having a top portion, wherein the top portion includes the cache memory, the branch predictor and the fetch unit and excludes the execution unit. The microprocessor is configured to refrain from retiring the mispredicted branch instruction as resolved and replay the load instruction, the branch instruction and the instructions fetched at the predicted target address without re-fetching them from the cache memory and without re-processing them in the top portion of the pipeline.

According to another aspect, the present invention provides a method for selectively executing a branch instruction in a pipelined out-of-order execution in-order retire microprocessor. The method includes predicting a branch instruction will be resolved to a first fetch path and fetching instructions from the first fetch path in response to said predicting. The method also includes resolving the branch instruction to a second fetch path different from the first fetch path, after said predicting and fetching. The method also includes determining whether there is an unretired load instruction that missed in a cache memory of the microprocessor and that is older than the branch instruction in program order. The method also includes executing the branch instruction by flushing instructions fetched at the first fetch path and fetching from the second fetch path if there is not an unretired load instruction that missed in the cache memory and that is older than the branch instruction in program order. The method also includes, if there is an unretired load instruction that missed in the cache memory and that is older than the branch instruction in program order: refraining from said executing the branch instruction; refraining from retiring the mispredicted branch instruction as resolved; and replaying the load instruction, the branch instruction and the instructions fetched at the predicted target address without re-fetching them from the cache memory and without re-processing them in a top portion of a pipeline of the microprocessor. The top portion includes a cache memory from which said fetching is performed, a branch predictor that performs said predicting, and a fetch unit that performs said fetching and excludes an execution unit that performs said executing.

According to yet another aspect, the present invention provides a computer program product for use with a computing device, the computer program product comprising a computer usable non-transitory storage medium having computer readable program code embodied in said medium for specifying a pipelined out-of-order execution in-order retire microprocessor. The computer readable program code includes first program code for specifying a branch predictor configured to predict a target address of a branch instruction. The computer readable program code also includes second program code for specifying a fetch unit, coupled to the branch predictor, configured to fetch instructions at the predicted target address. The computer readable program code also includes third program code for specifying an execution unit coupled to the fetch unit. The execution unit is configured to resolve a target address of the branch instruction and detect that the predicted and resolved target addresses are different. The execution unit is also configured to determine whether there is an unretired load instruction that missed in the cache memory and that is older in program order than the branch instruction in response to detecting that the predicted and resolved target addresses are different. The execution unit is also configured to execute the branch instruction by flushing instructions fetched at the predicted target address and causing the fetch unit to fetch from the resolved target address if there is not an unretired load instruction that missed in the cache memory and that is older in program order than the branch instruction. The execution unit is also configured to refrain from executing the branch instruction if there is an unretired load instruction older than the branch instruction in program order and that missed in the cache memory. The microprocessor further comprises a pipeline having a top portion, wherein the top portion includes the cache memory, the branch predictor and the fetch unit and excludes the execution unit. The microprocessor is configured to refrain from retiring the mispredicted branch instruction as resolved and replay the load instruction, the branch instruction and the instructions fetched at the predicted target address without re-fetching them from the cache memory and without re-processing them in the top portion of the pipeline.

DETAILED DESCRIPTION OF THE INVENTION

Figure 1:
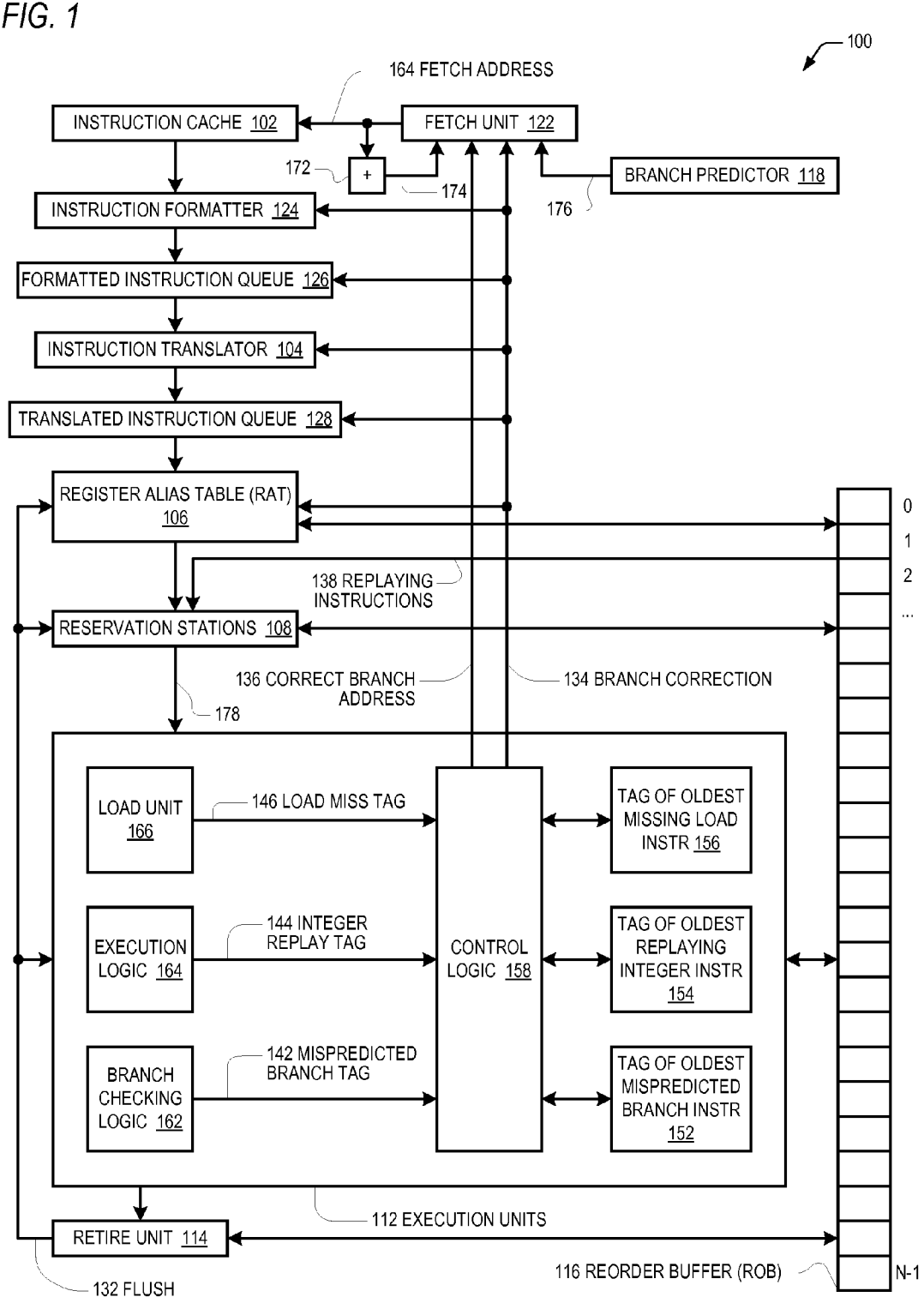
FIG. 1 is a block diagram illustrating a microprocessor according to the present invention.

Referring now to FIG. 1, a block diagram illustrating a microprocessor 100 according to the present invention is shown. The microprocessor 100 includes a pipeline of stages or functional units, including an instruction fetch unit 122, an instruction cache 102, an instruction formatter 124, a formatted instruction queue 126, an instruction translator 104, a translated instruction queue 128, a register alias table (RAT) 106, reservation stations 108, execution units 112, and a retire unit 114. The microprocessor 100 also includes a branch predictor 118, coupled to the fetch unit 122. The microprocessor 100 also includes a reorder buffer (ROB) 116, coupled to the RAT 106, reservation stations 108, execution units 112, and retire unit 114.

The execution units 112 include a load unit 166, execution logic 164, and branch checking logic 162, each coupled to control logic 158. The execution units 112 also include a register 156 for storing the ROB tag of the oldest missing load instruction, a register 154 for storing the ROB tag of the oldest replaying integer instruction, and a register 152 for storing the ROB tag of the oldest mispredicted branch instruction, each coupled to the control logic 158. The control logic 158 generates a correct branch address 136 to the fetch unit 122. The control logic 158 also generates a branch correction signal 134, which is provided to the fetch unit 122, the instruction formatter 124, the formatted instruction queue 126, the instruction translator 104, the translated instruction queue 128, and the RAT 106. In one embodiment, the elements shown in the execution units 112 are included within a single execution unit, namely one of the integer units, except for the load unit 166, which is a separate execution unit 112 from the integer unit.

In one embodiment, the microprocessor 100 is an x86 architecture microprocessor 100. A microprocessor is an x86 architecture processor if it can correctly execute a majority of the application programs that are designed to be executed on an x86 microprocessor. An application program is correctly executed if its expected results are obtained. The microprocessor 100 executes instructions out-of-order and retires them in-order. Thus, even though the execution units 112 may generate the results of instructions out of program order, the retire unit 114 waits to update the architectural state of the microprocessor 100 with an instruction's result until the instruction is the oldest completed instruction in the microprocessor 100.

The fetch unit 122 provides a fetch address 164 to the instruction cache 102 for specifying the next address from which to fetch instructions. An adder 172 increments the fetch address 164 to generate the next sequential address 174, which is provided to the fetch unit 122. The fetch unit 122 also receives a predicted target address 176 from the branch predictor 118. The fetch unit 122 also receives the correct branch address 136 from the execution units 112. The fetch unit 122 selects one of the provided addresses as the fetch address 164 to the instruction cache 102 as described below.

If the control logic 158 asserts the branch correction signal 134, the fetch unit 122 selects the correct branch address 136; otherwise, if the branch predictor 118 predicts the branch direction is taken, the fetch unit 122 selects the predicted target address 176; otherwise, the fetch unit 122 selects the next sequential address 174. The predicted branch address of a branch instruction is provided along with the branch instruction down the pipeline. The predicted branch address is the next sequential address 174 if the branch was predicted not taken, and the predicted branch address is the predicted target address 176 if the branch is predicted taken. The branch predictor 118 may mispredict a branch instruction, which requires the microprocessor 100 to correct the misprediction so that the correct instructions are fetched and executed. If the execution units 112 subsequently correct the branch (as discussed below), then the predicted branch address becomes the correct branch address 136. The predicted branch address is provided along with the instruction and other information about the instruction 178 to the execution units 112.

A beneficial scenario in which the microprocessor 100 corrects a mispredicted branch instruction will now be described according to the following steps.

Step 1: An execution unit 112 resolves the branch instruction. That is, the execution unit 112 receives the input operands required to resolve the branch instruction and determines the branch direction and branch address based on the input operands. Specifically, the execution unit 112 examines the condition code specified by the branch instruction to determine whether the condition code satisfies the branch condition specified by the branch instruction such that the branch will be taken or not taken; and, the execution unit 112 calculates the target address of the branch instruction based on the source operands specified by the branch instruction. After resolving the direction and target address of the branch instruction, the execution unit 112 determines that the branch predictor 118 mispredicted the branch, either because it predicted an incorrect direction (taken or not taken) and/or predicted an incorrect branch target address. For ease of discussion, the branch predictor 118 predicted and the fetch unit 122 fetched from path A; however, path B was the correct branch path.

Step 2: Consequently, the execution unit 112 executes the branch. That is, the execution unit 112: (1) tells the RAT 106 to stop dispatching instructions; (2) flushes the top of the pipeline; and (3) tells the fetch unit 122 to begin fetching at the correct branch path B, which is indicated by the correct branch address 136 supplied by the execution unit 112. The RAT 106 is the last stage of the pipeline that receives instructions in program order. The top of the pipeline is the portion above the RAT 106. In many cases, there may be many instructions in the microprocessor 100 older than the mispredicted branch instruction that must retire in program order before the branch becomes the oldest instruction and is allowed to retire. Thus, during the time it takes for the branch to become the oldest instruction, the microprocessor 100 is fetching and processing and filling up the top of the pipeline with good instructions, i.e., instructions from the correct path B.

Step 3: The retire unit 114 eventually retires the branch instruction and flushes the bottom of the pipeline because it contains instructions that should not have been executed because they were fetched from the wrong branch path A. The bottom of the pipeline is the portion below the RAT 106.

Step 4: The retire unit 114 tells the RAT 106 to start dispatching instructions again, i.e., the instructions that were fetched from the correct path B and processed when the execution unit 112 executed the branch at step 2.

The execution of the branch instruction out of program order at step 2 described above (i.e., early correction of the misprediction) is advantageous because the front end of the pipeline may begin fetching and processing instructions at the correct branch address 136 before the retire unit 114 is ready to retire the mispredicted branch instruction. That is, those instructions fetched from correct branch path B will get executed N clocks sooner than if the execution unit 112 had not executed the branch in response to the misprediction, but instead waited until the branch was ready to retire. N is at most the number of clocks it takes from when the microprocessor 100 starts executing the branch (i.e., correcting the misprediction) until the first instruction from the "correct" branch path B reaches the RAT 106. This is particularly advantageous because the branch penalty in one embodiment is 17 clock cycles. More specifically, in one embodiment, it takes 10 clock cycles once the fetch address 164 is redirected to a new branch path until the first instructions from the new branch path reach the RAT 106. Stated alternatively, by correcting early, some of these clock cycles may be hidden; in particular, the microprocessor 100 may hide the number of clocks between when the correction begins and when the retire unit 114 is ready to retire the mispredicted branch instruction.

However, it is not always beneficial to execute/correct a branch instruction out of order. A detrimental scenario in which the microprocessor 100 executes/corrects a branch instruction out of program order will now be described according to the following steps. In particular, the detrimental scenario is one in which the branch predictor 118 actually correctly predicted the branch instruction; however, the execution unit 112 incorrectly resolved the branch instruction because it received incorrect input operands (e.g., condition codes and/or target address calculation operands). Consequently, the execution unit 112 erroneously thought that the branch predictor 118 mispredicted the branch (i.e., the execution unit 112 determined that the predicted direction and/or branch address did not match the resolved direction and/or branch address) and executed/corrected the branch. The execution unit 112 may have received incorrect data because the branch instruction was dependent for the condition codes and/or source operands upon an older instruction, either directly or indirectly via a chain of dependencies, that did not supply the appropriate input value. For example, an older load instruction somewhere in the dependency chain missed in the data cache causing it to provide stale data. For ease of discussion in describing the detrimental scenario, assume that the branch predictor 118 predicted and the fetch unit 122 fetched from path A. Then the following steps occur:

Step 1: same as step 1 from the beneficial scenario above, i.e., the execution unit 112 resolves the branch instruction to path B.

Step 2: same as step 2 from the beneficial scenario above, i.e., the execution unit 112 executes/corrects the branch instruction to path B.

Step 3: Subsequent to the correction/execution at step 2, an instruction older than the executed/corrected branch of steps 1 and 2 becomes the oldest instruction, and the retire unit 114 causes a replay of the oldest instruction and all newer instructions in the ROB 116, which includes the executed/corrected branch. The replay means the retire unit 114 flushes the bottom of the pipeline and re-dispatches in-order all valid instructions in the ROB 116 to the reservation stations 108. (If the older instruction being replayed is a mispredicted branch, then the top of the pipeline also will have been flushed when the execution unit 112 executed/corrected the now replaying older branch.)

Step 4: On replay of the same branch instruction that was executed/corrected at step 2, the execution unit 112 resolves the branch instruction and determines that path A, rather than path B, is the correct path. This means the instructions flushed from the top of the pipeline at step 2 were actually the correctly fetched instructions. Unfortunately, this means the microprocessor 100 now has to correct the "correction" performed at step 2. (It is noted that on the replay, the "prediction" seen by the execution unit 112 is path B, i.e., the path to which the execution unit 112 corrected at step 2; however, this "prediction" to path B was not made by the branch predictor 118; rather, it was made by the execution unit 112 when the execution unit 112 executed/corrected the branch at step 2.)

Step 5: The execution unit 112 executes/corrects the branch, similar to step 2 above, based on the resolution made during the replay at step 4. However, this time the execution unit 112 corrects to path A. Thus, the execution/correction made at step 2 was disadvantageous because it caused the microprocessor 100 to flush the instructions it began fetching and processing when the branch predictor 118 correctly predicted path A prior to step 1, and those same instructions must now be re-fetched and re-processed by the top of the pipeline.

To summarize the detrimental scenario, initially the branch predictor 118 predicts path A from which the fetch unit 122 fetches. Subsequently, the execution unit 112 resolves the branch to path B, which is actually incorrect because the execution unit 112 received incorrect operands, and executes/corrects at step 2 to cause the fetch unit 122 to fetch from path B. However, the branch is replayed (because an older instruction caused it to be), and during the replay the execution unit 112 resolves to path A, which is the true correct branch path. The execution unit 112 resolved to path A on the replay because the execution unit 112 received the correct input operands for the branch instruction on the replay. This is because the instruction in the dependency chain that did not provide a correct result on the first resolution has now produced the correct result, which is provided to the execution unit 112 to resolve the branch instruction. That is, the condition code flags and/or target address calculation operands were different on the replay than they were the first time the execution unit 112 resolved the branch. Consequently, the execution unit 112 executes/corrects to cause the fetch unit 122 to fetch from path A.

To address this problem, i.e., to enjoy the benefits of the beneficial scenario, but reduce the likelihood of the detrimental scenario, the microprocessor 100 normally executes mispredicted branches out of program order; however, it also attempts to identify the most common situations in which the branch may have been erroneously resolved as mispredicted (i.e., where the branch predictor 118 correctly predicted), and in those cases it does not execute/correct a resolved "mispredicted" branch out of order. More specifically, it attempts to identify the most common cases where the branch will have to be replayed and on replay may resolve as having been correctly predicted. In one embodiment, these common cases are when an older instruction than the branch will have to be replayed, namely:

(1) an older branch resolved as mispredicted
(2) an older load missed
(3) an older integer instruction faulted By refraining from executing the resolved "mispredicted" branch, the microprocessor 100 may avoid having to re-fetch and re-process in the top of the pipeline the same instructions it had already fetched and processed the first time the branch was predicted.

Deciding which set of cases to track and which set not to track is a design decision that balances the tradeoff between the complexity/speed/power consumption costs of tracking a given case and the detrimental performance impact of not tracking it, which is essentially a function of its frequency of occurrence and the average penalty in number of clock cycles.

Referring again to FIG. 1, the ROB 116 is organized as a circular queue and includes an entry for each instruction that has been dispatched by the RAT 106 to the reservation stations 108. Each entry in the ROB 116 has an associated index, ranging from zero to n−1, where n is the number of entries in the ROB 116. The RAT 106 allocates the entries in the ROB 116 for the instructions in program order. Thus, it is possible to compare the ROB 116 index, or tag, of two instructions and determine which instruction is oldest in program order.

The microprocessor 100 performs speculative execution on load instructions. That is, the microprocessor 100 assumes that load instructions always hit in the data cache. Consequently, the reservation stations 108 issue instructions that use load data as source operands to the execution units 112 without knowing whether the correct load data is actually available. Therefore, an instruction, such as a branch instruction, may receive incorrect data, either directly or indirectly in the result of an older instruction that used incorrect load data and so forth. When the load unit 166 detects that a load instruction misses in the data cache and must therefore be replayed, the load unit 166 outputs to the control logic 158 the ROB tag 146 of the load instruction that missed in the cache.

The control logic 158 compares the tag in register 156 with the load miss tag 146. If the load miss tag 146 is older, then the control logic 158 updates the register 156 with the load miss tag 146. In this way, the control logic 158 maintains the tag of the oldest missing load instruction in the microprocessor 100.

Similarly, when the execution logic 164 detects that an integer instruction must be replayed, the execution logic 164 outputs to the control logic 158 the ROB tag 144 of the integer instruction that must be replayed. The control logic 158 compares the tag in register 154 with the integer replay tag 144. If the integer replay tag 144 is older, then the control logic 158 updates the register 154 with the integer replay tag 144. In this way, the control logic 158 maintains the tag of the oldest replaying integer instruction in the microprocessor 100.

Still further, when a branch instruction is resolved and the branch checking logic 162 detects that a branch instruction was mispredicted, the branch checking logic 162 outputs to the control logic 158 the ROB tag 142 of the branch instruction that was mispredicted. The control logic 158 compares the tag in register 152 with the mispredicted branch tag 142. If the mispredicted branch tag 142 is older, then the control logic 158 updates the register 152 with the mispredicted branch tag 142. In this way, the control logic 158 maintains the tag of the oldest mispredicted branch instruction in the microprocessor 100.

Figure 2:
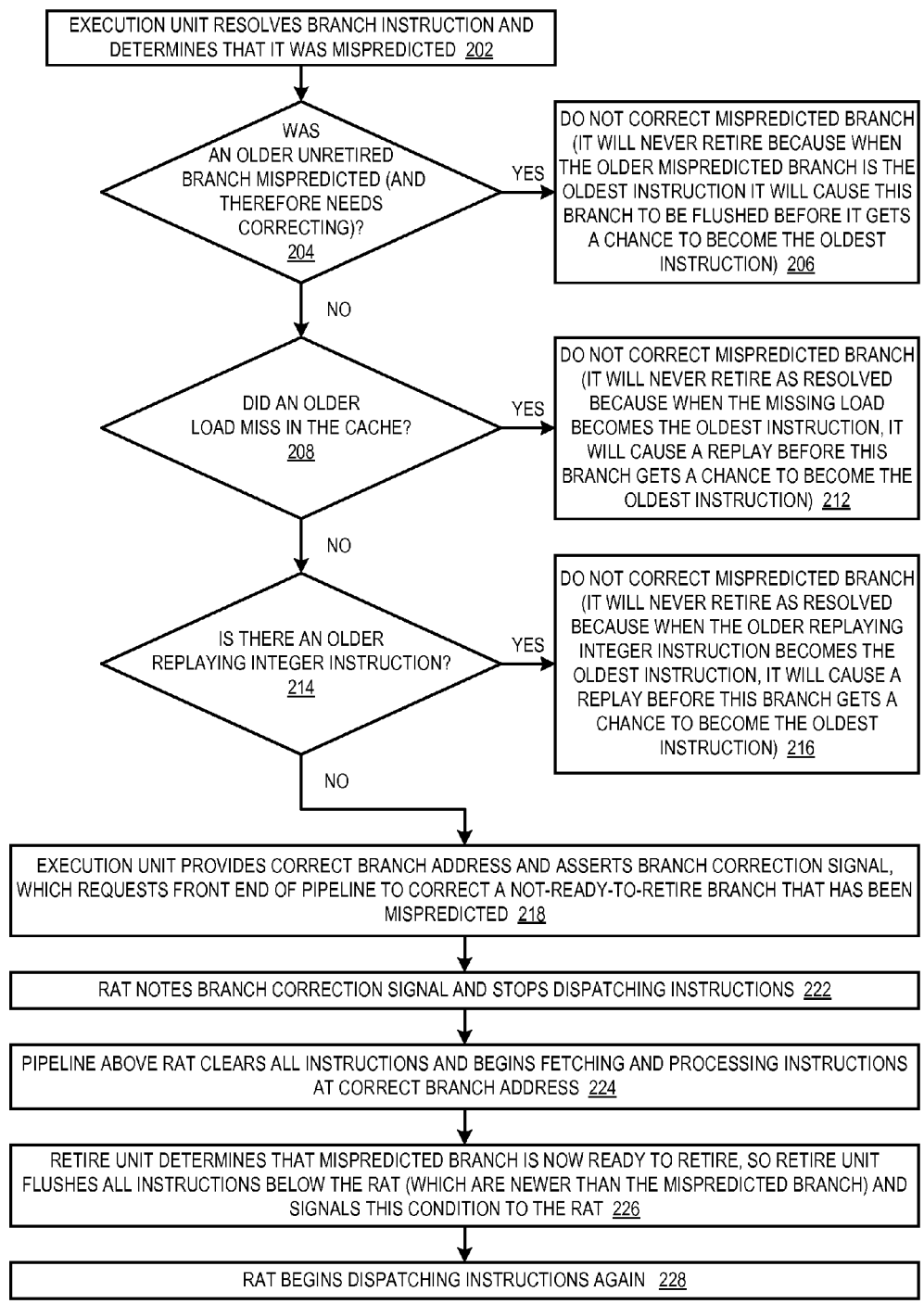
FIG. 2 is a flowchart illustrating operation of the microprocessor of FIG. 1 to selectively execute branch instructions out of order according to the present invention.

Referring now to FIG. 2, a flowchart illustrating operation of the microprocessor 100 of FIG. 1 to selectively execute branch instructions out of order according to the present invention is shown. Flow begins at block 202.

At block 202, the execution unit 112 resolves a branch instruction and determines that it was mispredicted. Flow proceeds to decision block 204.

At decision block 204, the execution unit 112 compares the tag of the mispredicted branch with the tag in register 152 to determine whether there is an older unretired branch instruction that was mispredicted and therefore needs correcting. If so, flow proceeds to block 206; otherwise, flow proceeds to decision block 208.

At block 206, the execution unit 112 refrains from correcting/executing out of order the newer branch instruction that was resolved as mispredicted at block 202. The newer branch instruction that was resolved as mispredicted at block 202 will never retire because when the older mispredicted branch becomes the oldest instruction in the machine, it will cause the newer mispredicted branch instruction to be flushed from the bottom of the pipeline before the newer mispredicted branch gets a chance to become the oldest instruction. Advantageously, by not correcting/executing out of order the branch instruction that was resolved as mispredicted at block 202, the microprocessor 100 may avoid the detrimental scenario described above. That is, if is turns out that the branch predictor 118 had originally correctly predicted the branch instruction path, then the instructions fetched at the correctly predicted path advantageously may not have to be re-fetched and re-processed by the top of the pipeline. Flow ends at block 206.

At decision block 208, the execution unit 112 compares the tag of the mispredicted branch with the tag in register 156 to determine whether there is a missing load instruction that is older than the mispredicted branch. If so, flow proceeds to block 212; otherwise, flow proceeds to decision block 214.

At block 212, the execution unit 112 refrains from correcting/executing out of order the branch instruction that was resolved as mispredicted at block 202. The branch instruction that was resolved as mispredicted at block 202 will never retire as resolved because when the missing load instruction becomes the oldest instruction in the machine, it will cause a replay of the branch before the branch gets a chance to become the oldest instruction. Advantageously, by not correcting/executing out of order the branch instruction that was resolved as mispredicted at block 202, the microprocessor 100 may avoid the detrimental scenario described above. Flow ends at block 212.

At decision block 214, the execution unit 112 compares the tag of the mispredicted branch with the tag in register 154 to determine whether there is an integer instruction that is marked for replay that is older than the mispredicted branch. If so, flow proceeds to block 216; otherwise, flow proceeds to block 218.

At block 216, the execution unit 112 refrains from correcting/executing out of order the branch instruction that was resolved as mispredicted at block 202. The branch instruction that was resolved as mispredicted at block 202 will never retire as resolved because when the replaying integer instruction becomes the oldest instruction in the machine, it will cause a replay of the branch before the branch gets a chance to become the oldest instruction. Advantageously, by not correcting/executing out of order the branch instruction that was resolved as mispredicted at block 202, the microprocessor 100 may avoid the detrimental scenario described above. Flow ends at block 216.

At block 218, the control logic 158 provides the correct branch address 136 to the fetch unit 122. The control logic 158 also asserts the branch correction signal 134, which causes the fetch unit 122 to select the correct branch address 136 as the next fetch address 164, and which causes the top of the pipeline to correct the branch instruction that was resolved to be mispredicted at block 202. That is, by asserting the branch correction signal 134, the control logic 158 causes the mispredicted branch to be executed out of order, thereby advantageously realizing the benefits described above with respect to the beneficial scenario. Flow proceeds to block 222.

At block 222, the RAT 106, in response to the asserted branch correction signal 134, stops dispatching instructions. Flow proceeds to block 224.

At block 224, in response to the asserted branch correction signal 134, the portions of the pipeline above the RAT 106 clear (i.e., flush or invalidate) all instructions and begin fetching and processing instructions at the correct branch address 136. Flow proceeds to block 226.

At block 226, the retire unit 114 determines that the mispredicted branch is now ready to retire (i.e., it is the oldest instruction in the machine) and asserts the flush signal 132 to flush all instructions below the RAT 106, i.e., the retire unit 114 flushes all instructions newer than the mispredicted branch. The asserted flush signal 132 is also provided to the RAT 106. Flow proceeds to block 228.

At block 228, the RAT 106, in response to the asserted flush signal 132, begins dispatching instructions again. Flow ends at block 228.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog™ HDL, very high-speed integrated circuits (VHSIC) HDL (VHDL), and so on, or other available programs. Such software can be disposed in any known computer usable medium such as semiconductor, magnetic disk, or optical disc (e.g., Compact Disc Read-only Memory (CD-ROM), Digital Video Disc Read-only Memory (DVD-ROM), etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A pipelined out-of-order execution in-order retire microprocessor, comprising:
   a cache memory;
   a branch predictor, configured to predict a target address of a branch instruction;
   a fetch unit, coupled to the branch predictor, configured to fetch instructions at the predicted target address; and
   an execution unit, coupled to the fetch unit, configured to:
      resolve a target address of the branch instruction and detect that the predicted and resolved target addresses are different;
      determine whether there is an unretired load instruction that missed in the cache memory and that is older in program order than the branch instruction, in response to detecting that the predicted and resolved target addresses are different;
      execute the branch instruction by flushing instructions fetched at the predicted target address and causing the fetch unit to fetch from the resolved target address, if there is not an unretired load instruction that missed in the cache memory and that is older in program order than the branch instruction; and
      refrain from executing the branch instruction, if there is an unretired load instruction older than the branch instruction in program order and that missed in the cache memory;
   wherein the microprocessor further comprises a pipeline having a top portion, wherein the top portion includes the cache memory, the branch predictor and the fetch unit and excludes the execution unit;
   wherein the microprocessor is configured to:
      refrain from retiring the mispredicted branch instruction as resolved; and
      replay the load instruction and the branch instruction without re-fetching them from the cache memory and without re-processing them in the top portion of the pipeline.

2. The microprocessor of claim 1, further comprising:
   a storage element, for maintaining a reorder buffer tag of the oldest unretired load instruction in program order that missed in the cache memory;
   wherein the execution unit is configured to determine whether there is an unretired load instruction that missed in the cache memory and that is older in program order than the branch instruction by comparing a reorder buffer tag of the branch instruction with the reorder buffer tag of the oldest unretired load instruction in program order that missed in the cache memory.

3. The microprocessor of claim 1, further comprising:
a register alias table (RAT), configured to receive program instructions in program order and configured to dispatch the program instructions for out-of-order execution to a plurality of execution units of the microprocessor; and
a plurality of pipeline stages above the RAT, including the branch predictor and fetch unit;
wherein the execution unit is configured to execute the branch instruction by providing the resolved target address to the fetch unit and asserting a signal;
wherein the RAT stops dispatching instructions in response to the signal;
wherein the plurality of pipeline stages above the RAT flush all instructions therein in response to the signal;
wherein the fetch unit begins fetching instructions from the resolved target address in response to the signal.

4. The microprocessor of claim 3, further comprising:
a retire unit, configured to retire the program instructions in program order; and
a plurality of pipeline stages below the RAT, including the plurality of execution units and the retire unit;
wherein if and when the retire unit determines that the branch instruction is the oldest unretired instruction in the microprocessor, the retire unit causes all instructions in the plurality of pipeline stages below the RAT to be flushed;
wherein the RAT begins dispatching instructions to the plurality of execution units after the retire unit causes all instructions in the plurality of pipeline stages below the RAT to be flushed.

5. The microprocessor of claim 1, further comprising:
a register alias table (RAT), configured to receive program instructions in program order and configured to dispatch the program instructions for out-of-order execution to a plurality of execution units of the microprocessor;
a retire unit, configured to retire the program instructions in program order; and
a plurality of pipeline stages below the RAT, including the plurality of execution units and the retire unit;
wherein if and when the retire unit determines that the load instruction that missed in the cache memory is the oldest unretired instruction in the microprocessor:
the retire unit flushes all instructions in the plurality of pipeline stages below the RAT and re-dispatches the missing load instruction and the branch instruction to the plurality of execution units for execution; and
if the execution unit refrained from executing the branch instruction, the RAT re-dispatches the instructions fetched from the predicted target address to the plurality of execution units for execution.

6. A method for selectively executing a branch instruction in a pipelined out-of-order execution in-order retire microprocessor, the method comprising:
predicting a branch instruction will be resolved to a first fetch path and fetching instructions from the first fetch path in response to said predicting;
resolving the branch instruction to a second fetch path different from the first fetch path, after said predicting and fetching;
determining whether there is an unretired load instruction that missed in a cache memory of the microprocessor and that is older than the branch instruction in program order;

executing the branch instruction by flushing instructions fetched at the first fetch path and fetching from the second fetch path, if there is not an unretired load instruction that missed in the cache memory and that is older than the branch instruction in program order; and
if there is an unretired load instruction that missed in the cache memory and that is older than the branch instruction in program order:
refraining from said executing the branch instruction;
refraining from retiring the mispredicted branch instruction as resolved; and
replaying the load instruction and the branch instruction without re-fetching them from the cache memory and without re-processing them in a top portion of a pipeline of the microprocessor, wherein the top portion includes a cache memory from which said fetching is performed, a branch predictor that performs said predicting, and a fetch unit that performs said fetching and excludes an execution unit that performs said executing.

7. The method of claim 6, further comprising:
maintaining a reorder buffer tag of the oldest unretired load instruction in program order that missed in the cache memory;
wherein said determining whether there is an unretired load instruction that missed in the cache memory and that is older than the branch instruction in program order comprises comparing a reorder buffer tag of the branch instruction with the reorder buffer tag of the oldest unretired load instruction in program order that missed in the cache memory.

8. The method of claim 6, wherein said executing the branch instruction further comprises:
stopping dispatching instructions for execution; and
causing all instructions to be flushed in pipeline stages of the microprocessor above a point at which instructions are dispatched for execution.

9. The method of claim 8, further comprising:
determining that the branch instruction is the oldest unretired instruction in the microprocessor, subsequent to said causing all instructions to be flushed in pipeline stages of the microprocessor above a point at which instructions are dispatched for execution;
causing all instructions to be flushed in pipeline stages below the point at which instructions are dispatched for execution, in response to said determining that the branch instruction is the oldest unretired instruction in the microprocessor; and
beginning to dispatch instructions for execution again after said causing all instructions to be flushed in pipeline stages below the point at which instructions are dispatched for execution.

10. The method of claim 6, wherein the microprocessor includes a register alias table (RAT) configured to receive program instructions in program order and configured to dispatch the program instructions for out-of-order execution and a plurality of pipeline stages below the RAT, the method further comprising:
upon determining that the load instruction that missed in the cache memory is the oldest unretired instruction in the microprocessor:
flushing all instructions in the plurality of pipeline stages of the microprocessor below the RAT and re-dispatching the missing load instruction and the branch instruction for execution; and if the execution unit refrained from executing the branch instruction, re-dispatching the instructions fetched from the predicted target address for execution.

11. A computer program product for use with a computing device, the computer program product comprising:
   a computer usable non-transitory storage medium, having computer readable program code embodied in said medium, for specifying a pipelined out-of-order execution in-order retire microprocessor, the computer readable program code comprising:
      first program code for specifying a branch predictor, configured to predict a target address of a branch instruction;
      second program code for specifying a fetch unit, coupled to the branch predictor, configured to fetch instructions at the predicted target address; and
      third program code for specifying an execution unit, coupled to the fetch unit, configured to:
         resolve a target address of the branch instruction and detect that the predicted and resolved target addresses are different;
         determine whether there is an unretired load instruction that missed in a cache memory of the microprocessor and that is older in program order than the branch instruction, in response to detecting that the predicted and resolved target addresses are different;
         execute the branch instruction by flushing instructions fetched at the predicted target address and causing the fetch unit to fetch from the resolved target address, if there is not an unretired load instruction that missed in the cache memory and that is older in program order than the branch instruction; and
         refrain from executing the branch instruction, if there is an unretired load instruction older than the branch instruction in program order and that missed in the cache memory;
      wherein the microprocessor further comprises a pipeline having a top portion, wherein the top portion includes the cache memory, the branch predictor and the fetch unit and excludes the execution unit;
      wherein the microprocessor is configured to:
         refrain from retiring the mispredicted branch instruction as resolved; and
         replay the load instruction and the branch instruction without re-fetching them from the cache memory and without re-processing them in the top portion of the pipeline.

* * * * *